US012695397B2

(12) United States Patent
Xu

(10) Patent No.: US 12,695,397 B2
(45) Date of Patent: Jul. 28, 2026

(54) FAULT TOLERANCE CONTROL OF SOLID STATE TRANSFORMER

(71) Applicant: Huawei Digital Power Technologies Co., Ltd., Shenzhen (CN)

(72) Inventor: Rong Xu, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 212 days.

(21) Appl. No.: 18/629,521

(22) Filed: Apr. 8, 2024

(65) Prior Publication Data

US 2024/0258931 A1     Aug. 1, 2024

Related U.S. Application Data

(63) Continuation of application No. PCT/EP2021/077802, filed on Oct. 8, 2021.

(51) Int. Cl.
H02M 7/217      (2006.01)
H02M 1/32      (2007.01)
(Continued)

(52) U.S. Cl.
CPC ............. H02M 7/217 (2013.01); H02M 1/32 (2013.01); *H02J 3/36* (2013.01)

(58) Field of Classification Search
CPC ....... H02M 1/325; H02M 1/32; H02M 7/4835
See application file for complete search history.

(56) References Cited

U.S. PATENT DOCUMENTS

2012/0201059 A1* 8/2012 Berggren .................. H02J 3/36
                                                               363/53
2015/0236628 A1    8/2015 Wang et al.
(Continued)

FOREIGN PATENT DOCUMENTS

CN          102075096 B      9/2013
CN          107546844 A      1/2018

OTHER PUBLICATIONS

Zhao et al., "Module Power Balance Control and Redundancy Design Analysis of Cascaded PV Solid-State Transformer Under Fault Conditions," IEEE Journal of Emerging and Selected Topics in Power Electronics, vol. 9, No. 1, doi: 10.1109/JESTPE.2020. 2964950, Total 12 pages (Feb. 2021).

(Continued)

*Primary Examiner* — Sisay G Tiku
(74) *Attorney, Agent, or Firm* — Leydig, Voit & Mayer, Ltd.

(57)          ABSTRACT
A solid state transformer (SST) is provided, and is concerned with improving the fault tolerance of the SST. A method of operating the SST and an SST device including the SST are also provided. The SST has three parallel phase branches each having multiple cells, and each phase branch is connectable via a switch to a power grid. The method comprises operating the SST in a first control mode, in which each of the three phase branches is individually controlled. Further, when an open-circuit or short-circuit fault occurs in a cell of a particular phase branch, the method further comprises opening the switch connecting the particular phase branch to the power grid, and operating the SST in a second control mode, in which the two phase branches other than the particular phase branch are jointly controlled as a single phase branch.

20 Claims, 12 Drawing Sheets

(51) Int. Cl.
    *H02M 7/483*         (2007.01)
    *H02J 3/36*          (2006.01)

(56)                 References Cited

U.S. PATENT DOCUMENTS

| | | | |
|---|---|---|---|
| 2016/0218637 A1* | 7/2016 | Fan | H02M 7/4835 |
| 2018/0301980 A1 | 10/2018 | Keister et al. | |
| 2022/0368219 A1* | 11/2022 | Liu | H02M 1/0074 |
| 2023/0006535 A1* | 1/2023 | Freijedo Fernández | H02M 1/007 |
| 2023/0261563 A1* | 8/2023 | Fujiwara | H02M 7/487 |
| | | | 363/56.02 |
| 2023/0344240 A1* | 10/2023 | Freijedo Fernández | H02M 1/007 |

OTHER PUBLICATIONS

Gorla et al., "A fault tolerant control approach for a three-stage cascaded multilevel solid state transformer," 2017 IEEE 18th Workshop on Control and Modeling for Power Electronics (COMPEL), doi: 10.1109/COMPEL.2017.8013310, total 6 pages (Jul. 2017).

Shaodi et al., "Control Strategy for Single-Phase Open-Circuit Operation of a Modular Solid-State Transformer," IEEE Transactions on Power Electronics, vol. 34, No. 9, doi:10.1109/TPEL.2018.2885562, Total 19 pages (Sep. 2019).

Ko et al., "Modulation strategy for highly reliable cascade H-Bridge inverter based on discontinuous PWM," 2017 IEEE Applied Power Electronics Conference and Exposition (APEC), doi: 10.1109/APEC.2017.7931161, total 7 pages (Mar. 2017).

* cited by examiner

FAULT TOLERANCE CONTROL OF SOLID STATE TRANSFORMER

CROSS-REFERENCE TO RELATED APPLICATIONS

This application is a continuation of International Application No. PCT/EP2021/077802, filed on Oct. 8, 2021, the disclosure of which is hereby incorporated by reference in its entirety.

TECHNICAL FIELD

Embodiments of the present disclosure relate to a solid state transformer (SST). The disclosure is concerned with improving the fault tolerance of the SST. To this end, embodiments of the disclosure provide a method of operating the SST, an SST device including the SST and a controller, and a computer program for causing the controller to perform the method.

BACKGROUND

A SST is a kind of multilevel converter, which is often used in high/medium voltage (HVDC/MVDC) high power electronics applications, such as for a HVDC/MVDC grid, a flexible AC transmission system (FACTS) grid, a data center power system, a high/medium voltage drive, renewable energy, or a microgrid.

The SST is a power electronics transformer that is used to convert a high/medium AC voltage to a low DC voltage. The SST usually consists of an AC/DC power stage and a DC/DC power stage. The AC/DC power stage may be a three-phase cascaded multilevel converter. In such a topology, there are several cells in each of the three phase branches, each cell is connected to a load, and each phase branch is connected to a power grid.

An issue with such a topology is, that any cell of each phase branch may experience an open circuit fault or a short circuit fault during the operation of the SST. The occurrence of such a fault may severely affect the normal operation of the SST.

In particular, when a cell of a phase branch experiences such an open circuit fault or short circuit fault during the operation of the SST, the SST must be stopped and restarted to normal operation after replacing the faulty cell. This will affect the normal power supply to the load, and may cause economic losses.

SUMMARY

Accordingly, it is an objective of this disclosure to improve the fault tolerance of an SST. In particular, when an open circuit fault or short circuit fault happens in any cell of a phase branch during the normal operation of the SST. A goal is to keep the normal operation of the SST without immediately stopping its operation once such an open circuit fault or short circuit fault is detected. Another goal is to minimize a switching loss such case of a faulty cell, and to keep a DC capacitor voltage balanced in the faulty cell in case of the fault condition.

These and other objectives are achieved by the solutions of this disclosure as described in the enclosed independent claims. Advantageous implementations are further defined in the dependent claims.

A first aspect of this disclosure provides a method of operating a SST, wherein the SST has three parallel phase branches, each phase branch comprises multiple cells, and each phase branch is connected via at least one switch to a power grid, and wherein the method comprises: operating the SST in a first control mode, wherein each of the three phase branches is individually controlled; and when an open-circuit fault or a short-circuit fault occurs in at least one cell of a particular phase branch of the SST, the method further comprises: opening the at least one switch connecting the particular phase branch to the power grid; and operating the SST in a second control mode, wherein the two phase branches other than the particular phase branch are jointly controlled as a single phase branch.

Due to the method being able to operate the SST in the second control mode—which may be referred to as a fault tolerance control mode—it is not necessary to stop and restart the SST, when an open circuit fault or short circuit fault happens and is detected. The normal operation of the SST can be kept by switching off the phase branch that includes the faulty cell, and by switching from the first control mode—which may be referred to as a steady state control mode or normal control mode—to the second control mode. The switching loss is low. Overall, the fault tolerance of the SST can be significantly improved by the method of the first aspect.

In an implementation form of the first aspect, in the first control mode each of the three phase branches is controlled based on at least one of the following: an individual grid voltage for each phase branch; an individual grid current for each phase branch.

Thus, each phase branch is individually controlled.

In an implementation form of the first aspect, in the second control mode the two phase branches are controlled based on at least one of the following: a single grid voltage for both of the two phase branches; a single grid current for both of the two phase branches.

Thus, the two phase branches other than the particular phase branch are jointly controlled.

In an implementation form of the first aspect, in the second control mode the cells of the two phase branches are operated in a serial connection.

Thus, these two phase branches are operated jointly as a single phase branch having as many cells as the two individual phase branches together. For instance, if each phase branch has the same number of N cells, than the single phase branch has 2N cells.

In an implementation form of the first aspect, the method further comprises in the second control mode: adapting reference voltages of the cells of the two phase branches based on a discontinuous pulse width modulation (DPWM) voltage.

This can reduce or even minimize the switching loss. Moreover, this can keep the capacitor voltage balance during the SST fault condition.

In an implementation form of the first aspect, the method further comprises in the second control mode: adding or subtracting a DPWM voltage to or from a reference voltage of each cell of the two phase branches, respectively, wherein the DPWM voltage is subtracted from the reference voltage of one cell of the two phase branches to operate that cell in a clamped mode, and the DPWM voltage is added to each of the reference voltages of the other cells of the two phase branches to operate these other cells in a not-clamped mode.

This enables to leave a total reference voltage unchanged.

In an implementation form of the first aspect, the cells of the two phase branches are alternatingly operated in the clamped mode and the not-clamped mode.

This may enable keeping the DC voltages of all cells of the two phase branches in balance.

In an implementation form of the first aspect, a DC voltage of a cell that is operated in the clamped mode is increased.

In an implementation form of the first aspect, the method further comprises: sorting DC voltages of all the cells in the two-phase branches one or more times, in order to determine the cell having the lowest DC voltage; and operating the cell determined to have the lowest DC voltage in the clamped mode.

A second aspect of this disclosure provides a SST device comprising: a SST having three parallel phase branches, each phase branch comprising multiple cells, and each phase branch being connectable via at least one switch to a power grid; and a controller configured to: operate the SST in a first control mode, wherein each of the three phase branches is individually controlled; and when an open-circuit fault or a short-circuit fault occurs in at least one cell of a particular phase branch, the controller is further configured to: open the at least one switch connecting the particular phase branch to the power grid; and operate the SST in a second control mode, wherein the two phase branches other than the particular phase branch are jointly controlled as a single phase branch.

Due to the controller and the second control mode, which can be implemented by the controller to operate the SST, the SST device of the second aspect achieves the same advantages as described for the method of the first aspect. That is, a more fault tolerant control of the SST is enabled.

In an implementation form of the second aspect, in the second control mode the controller is further configured to: adapt reference voltages of the cells of the two phase branches based on a discontinuous pulse width modulation (DPWM) voltage.

In an implementation form of the second aspect, the controller comprises a DPWM unit and a DC voltage control unit, wherein in the second control mode the DPWM unit is configured to provide the DPWM voltage, wherein the DPWM voltage is subtracted from the reference voltage of one cell of the two phase branches to operate that cell in a clamped mode, and the DPWM voltage is added to the reference voltages of the other cells of the two phase branches to operate these other cells in a not-clamped mode; and the DC voltage control unit is configured to sort DC voltages of all the cells in the two-phase branches one or more times, determine the cell having the lowest DC voltage, and operate the cell determined to have the lowest DC voltage in the clamped mode.

In an implementation form of the second aspect, the controller is configured to control, in the first control mode, each of the three phase branches based on an individual grid voltage for each phase branch and/or an individual grid current for each phase branch; and/or control, in the second control mode, the two phase branches based on a single grid voltage for both of the two phase branches and/or a single grid current for both of the two phase branches.

In an implementation form of the second aspect, each phase branch of the SST comprises a cell array comprising the multiple cells of that phase branch connected in series; and the at least one switch connected in series between the cell array and a connection port for connecting that phase branch of the SST to the power grid.

In an implementation form of the second aspect, the at least one switch is connected to the cell array via an inductor and/or a resistor.

In an implementation form of the second aspect, each cell comprises a switchable power electronics device connected to a capacitor; and the capacitor is connected to a load, in order to supply power to the load.

A third aspect of this disclosure provides a computer program comprising instructions which, when the program is executed by a computer or controller, causes the computer or controller to perform the method according to the first aspect or any implementation form thereof.

The controller may be, in particular, a controller of an SST device that is configured to control an SST of that SST device. For example, it may be the controller of the SST device of the second aspect or any implementation form thereof.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
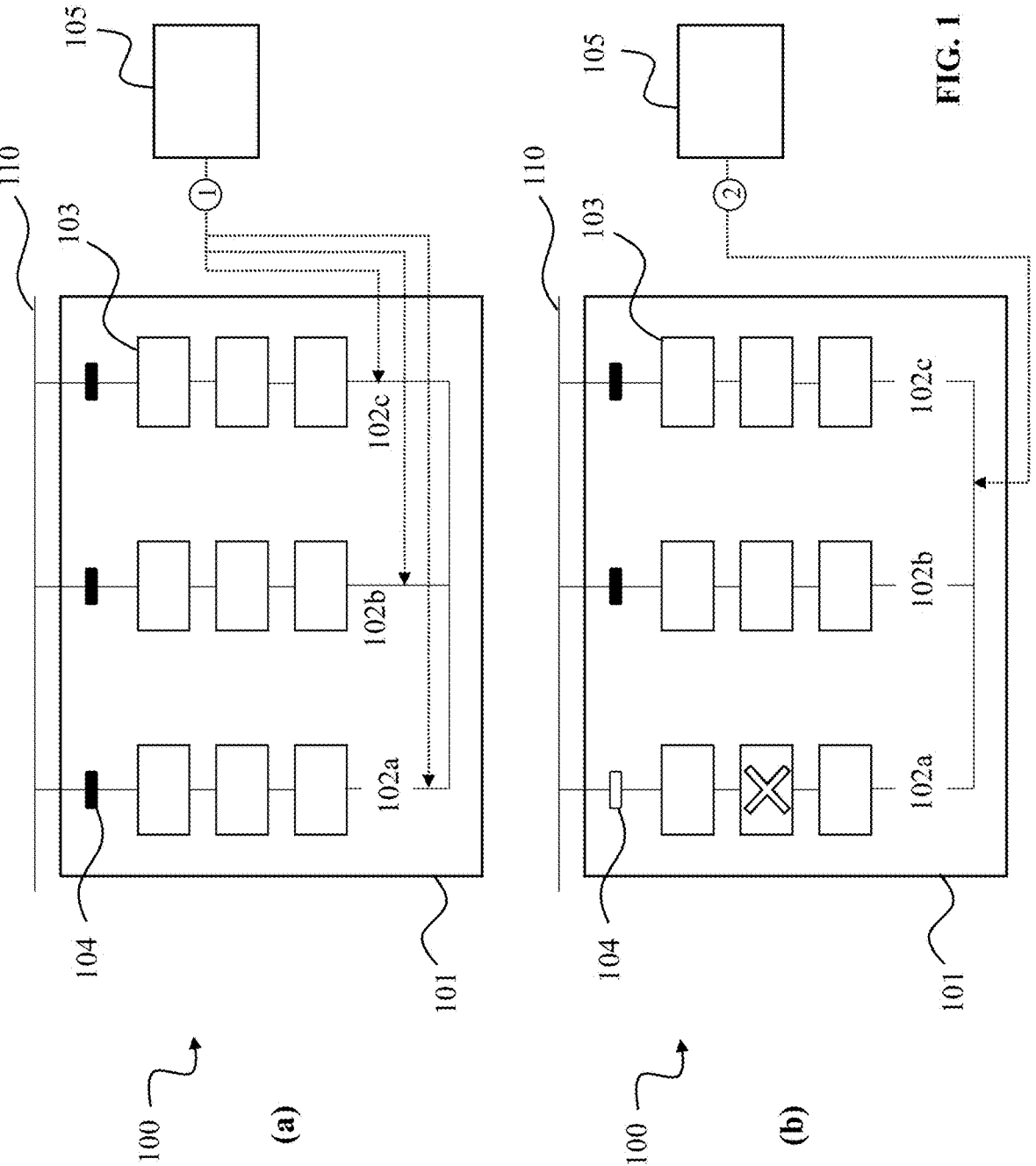
FIG. 1 shows an operation of a SST device according to an embodiment of this disclosure.

FIG. 1 illustrates a SST device 100 according to an embodiment of this disclosure, and a method of operating this SST device 100. The SST device 100 comprises a SST 101, which has three parallel phase branches 102a, 102b and 102c, respectively. Each of these phase branches 102a, 102b, and 102c comprises multiple cells 103 (as example, three cells 103 are shown in FIG. 1 per phase branch). Further, each of these phase branches 102a, 102b and 102c is connectable via one or more switches 104 (as example, switch 104 is shown in FIG. 1 per phase branch) to a power grid 110. The switches may be part of the SST device 100, while the power grid 110 is not part of the SST device 100. FIG. 1 shows the particular situation where each phase branch 102a, 102b and 102c is connected to the power grid 110.

The SST device 100 also comprise a controller 105, which is configured to control the SST 101. The controller 105 is to this end configured to perform a method of operating the SST 101. Thereby, the controller 105 is configured to control the SST 101 in a first control mode 1 and in a second control mode 2. The controller 105 may set either the first control mode 1 or the second control mode 2 for operating the SST 101. The controller 105 is configured to set the second control mode 2 when an open-circuit fault or a short-circuit fault occurs in at least one cell 103 of a particular phase branch, here the phase branch 102a, and to set the first control mode 1 otherwise.

In the first control mode 1—also referred to as the steady state control mode—the controller 105 is configured to control each of the three phase branches 102a, 102b and 102c individually. For instance, the controller 105 may set at least one of an individual grid voltage and an individual grid current for each of the phase branches 102a, 102b and 102c.

In the second control mode 2—also referred to as the fault tolerance control mode—the controller 105 is configured to open the at least one switch 104 that connects the particular phase branch 102a to the power grid 110. Further, the controller 105 is configured to jointly control the two phase branches 102b and 102c other than the particular phase branch 102a as a single phase branch. For instance, the controller 105 may set at least one of a single grid voltage and a single grid current for both of the two phase branches 102b and 102c.

The controller 105 may comprise a processor or processing circuitry (not shown) configured to perform, conduct or initiate the various operations of the controller 105 described herein, in particular, operate the SST 101 in the first control mode 1 and the second control mode 2. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The controller 105 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the controller 105 to be performed. In one embodiment, the processing circuitry comprises one or more processors and a non-transitory memory connected to the one or more processors. The non-transitory memory may carry executable program code which, when executed by the one or more processors, causes the controller 105 to perform, conduct or initiate the operations or methods to control the SST 101 described herein.

Figure 2:
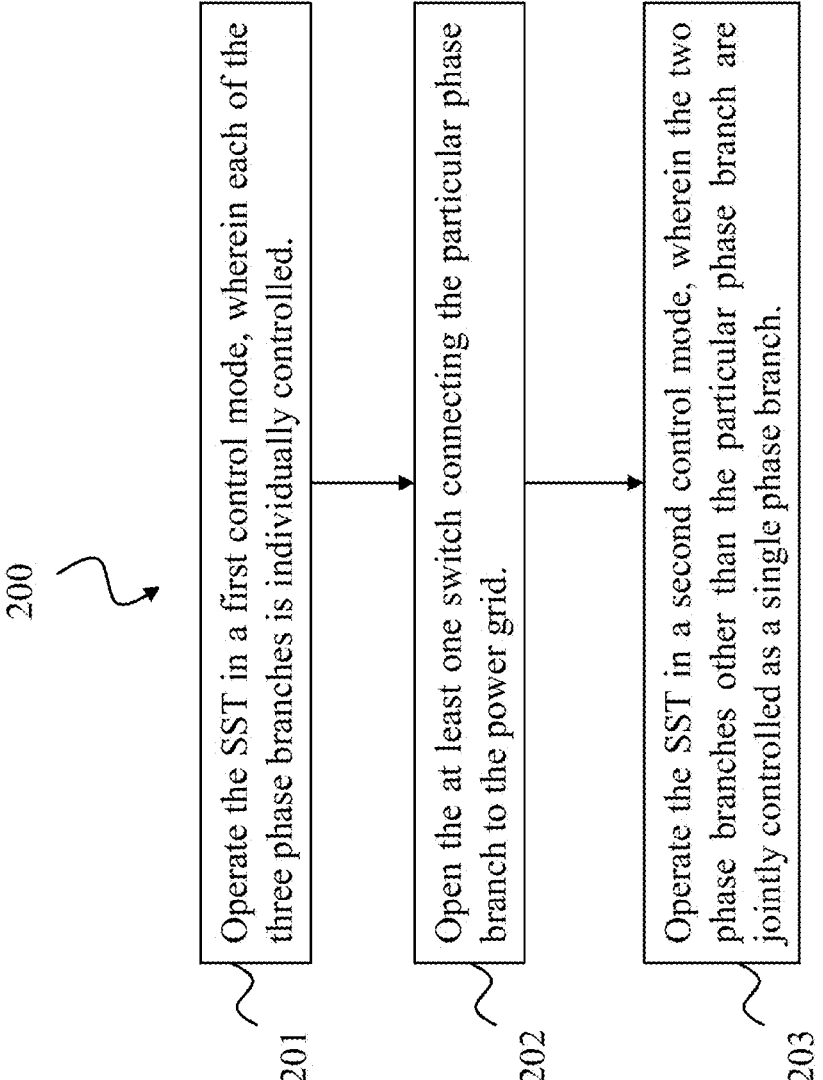
FIG. 2 shows a flow-diagram of a method of operating a SST according to an embodiment of this disclosure.

FIG. 2 shows a flowchart of a method 200 according to an embodiment of this disclosure. The method is for operating a SST, and may be performed by the SST device 100 shown in FIG. 1, particularly by the controller 105 to operate the SST 101.

The method 200 comprises a step 201 of operating the SST 101 in the first control mode 1. In the first control mode 1, each of the three phase branches 102a, 102b and 102c of the SST 101 is individually controlled. The first control mode 1 may be used, if there is no fault condition, i.e., all cells 103 of the SST 1 function normally. Further, when an open-circuit fault or a short-circuit fault occurs in at least one cell 103 of a particular phase branch 102a of the SST 101, the method 200 further comprises a step 202 of opening the at least one switch 104 connecting the particular phase branch 102a to the power grid 110. In this case, the method 200 also comprises a further step 203 of operating the SST 101 in the second control mode 2. In the second control mode 2, the two phase branches 102b and 102c, i.e. those other than the particular phase branch 102a, are jointly controlled as a single phase branch.

Figure 3:
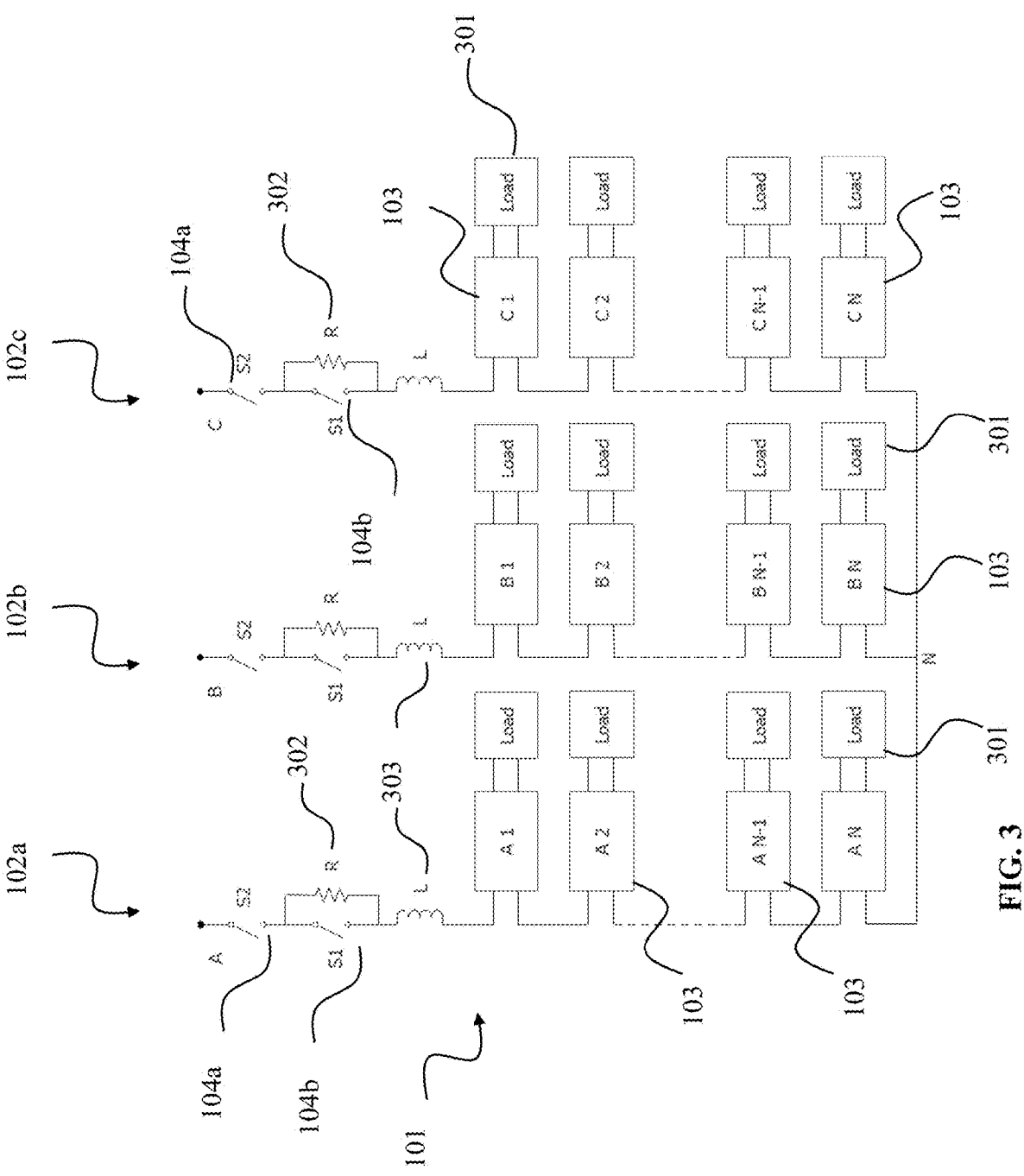
FIG. 3 shows an exemplary SST (implemented as three-phase cascaded multilevel converter) of a SST device according to an embodiment of this disclosure.

FIG. 3 shows an example of a SST 101, which may be included in a SST device 100 according to an embodiment of this disclosure, for instance, the SST device 100 shown in FIG. 1. The SST 101 comprises the three phase branches 102a, 102b and 102c with their respective plurality of cells 103. In particular, each phase branch 102a, 102b and 102c may comprise a cell array that includes the multiple cells 103 of said phase branch connected in series. Further, the at least one switch 104 may be connected in series between the cell array of the phase branch and a connection port for connecting that phase branch 102a, 102b or 102c to the power grid 110.

In FIG. 3, as an example, each phase branch 102a, 102b and 102c is connected to this connection point—for connecting it to the power grid 110—via an inductor 303, a pre-charge resistor 302, and two circuit breaker switches 104a and 104b (as the "at least one switch 104"). Further, it can be seen in FIG. 3 that each cell 103 is connected to a load 301. Each phase branch 102a, 102b and 102c may include N cells 103 and thus also N loads 301.

Figure 4:
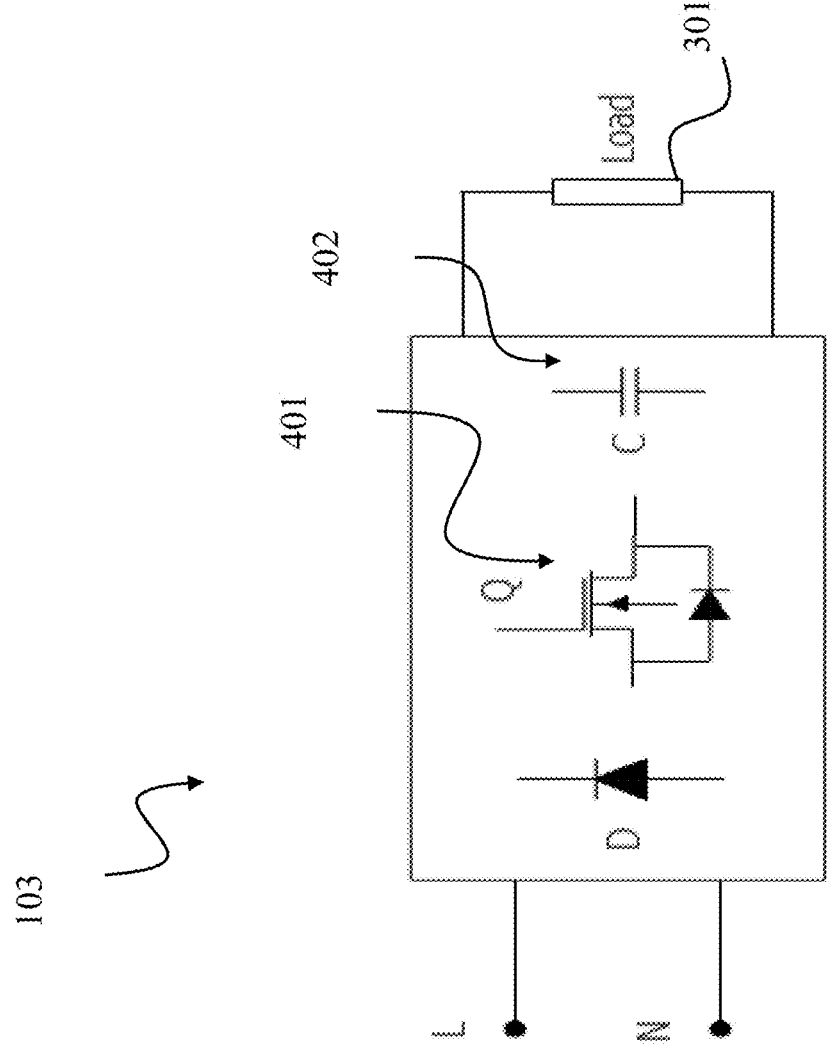
FIG. 4 shows an example of a cell of a SST.

FIG. 4 shows an example of a cell 103, as it can be used in each phase branch 102a, 102b, and/or 102c of the SST 101, for instance, the SST 101 shown in FIG. 3. The example cell 103 of FIG. 4 comprises an internal circuit, which comprises a switchable power electronics device 401 and a capacitor 402. The power electronics device 401 is connected to the capacitor 402, and the capacitor 402 is connected to the load 301 associated with the cell 103, in order to supply power to the load 301. The power electronics device 401 may comprise an Insulated Gate Bipolar Transistor (IGBT), a Metal-Oxide-Semiconductor Field Effect Transistor (MOSFET), or a SiC power device and may comprise a diode D. The two sides of the cell 103 may be connected to an AC voltage and the load 301, respectively. The DC capacitor 402 may supply the power to the load 301, for instance, such as a DC/DC stage or resistor.

Some characteristics of the cell circuit may be as follows. In a first case, when the switching signal of the power electronics device 401 is 0, the capacitor 402 is in a charging state and the DC voltage is increased. When the switching signal of the power electronics device 401 is 1, the capacitor 402 is in a discharging state and the DC voltage is decreased. In a second case, when the switching signal of the power electronics device 401 is 1, the capacitor 402 is in charging state and the DC voltage is increased. When the switching signal of the power electronics device 401 is 0, the DC capacitor 402 is in a discharging state and the DC voltage is decreased.

Figure 5:
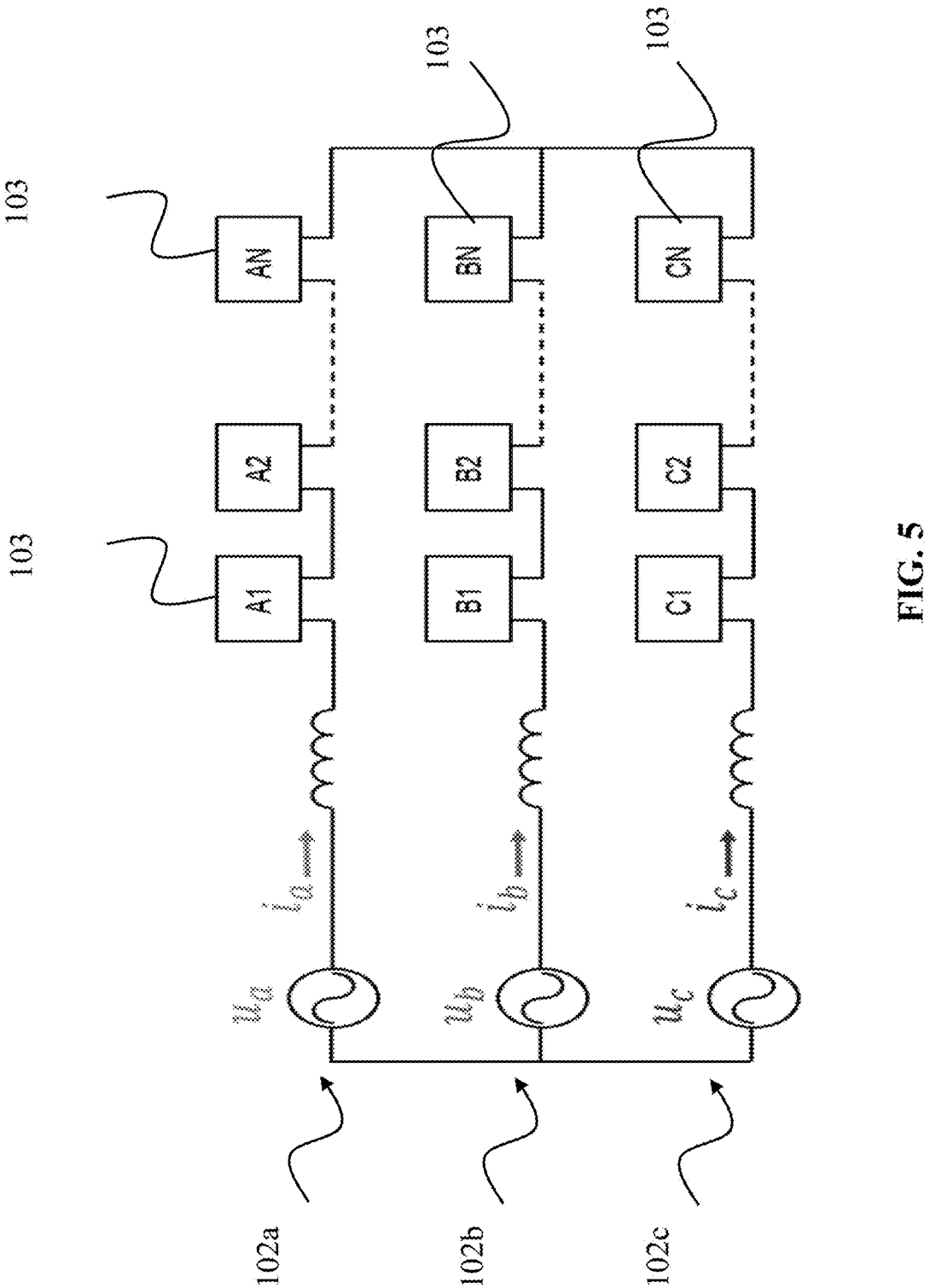
FIG. 5 shows a first control mode of a method for operating a SST according to an embodiment of this disclosure.

FIG. 5 shows the first control mode 1 of the method 200 for operating the SST 101 according to an embodiment of this disclosure. In this first control mode 1, the three phase SST 101 is operated in normal operation. The used system parameters to operate the SST 101 in this mode include at least one of grid voltages $u_a$, $u_b$, $u_c$ and grid currents $i_a$, $i_b$, $i_c$ (respectively, for the three phase branches 102a, 102b and 102c). The cell number of one phase branch in this case is $N \geq 2$. A DC voltage of each cell 103 is $V_{A1} \ldots V_{AN}$ (for the first phase branch 102a), $V_{B1} \ldots V_{BN}$ (for the second phase branch 102b), and $V_{C1} \ldots V_{CN}$ (for the third phase branch 102c).

When a cell 103 in a particular phase branch 102a has an open circuit fault or a short circuit fault during the operation of the SST 101, the circuit breaker switch 104 of that phase branch 102a is opened to cut off the connection between this particular phase branch 102a and the power grid 110. In addition, the first control mode 1 for operating the SST 101 is switched to the second control mode 2. In this second control mode 2, the faulty SST 101, with the remaining two phase branches 102b and 102c being non faulty, is controlled like a single phase SST. That is, the two phase branches 102b and 102c are jointly controlled as a single phase branch.

Figure 6:
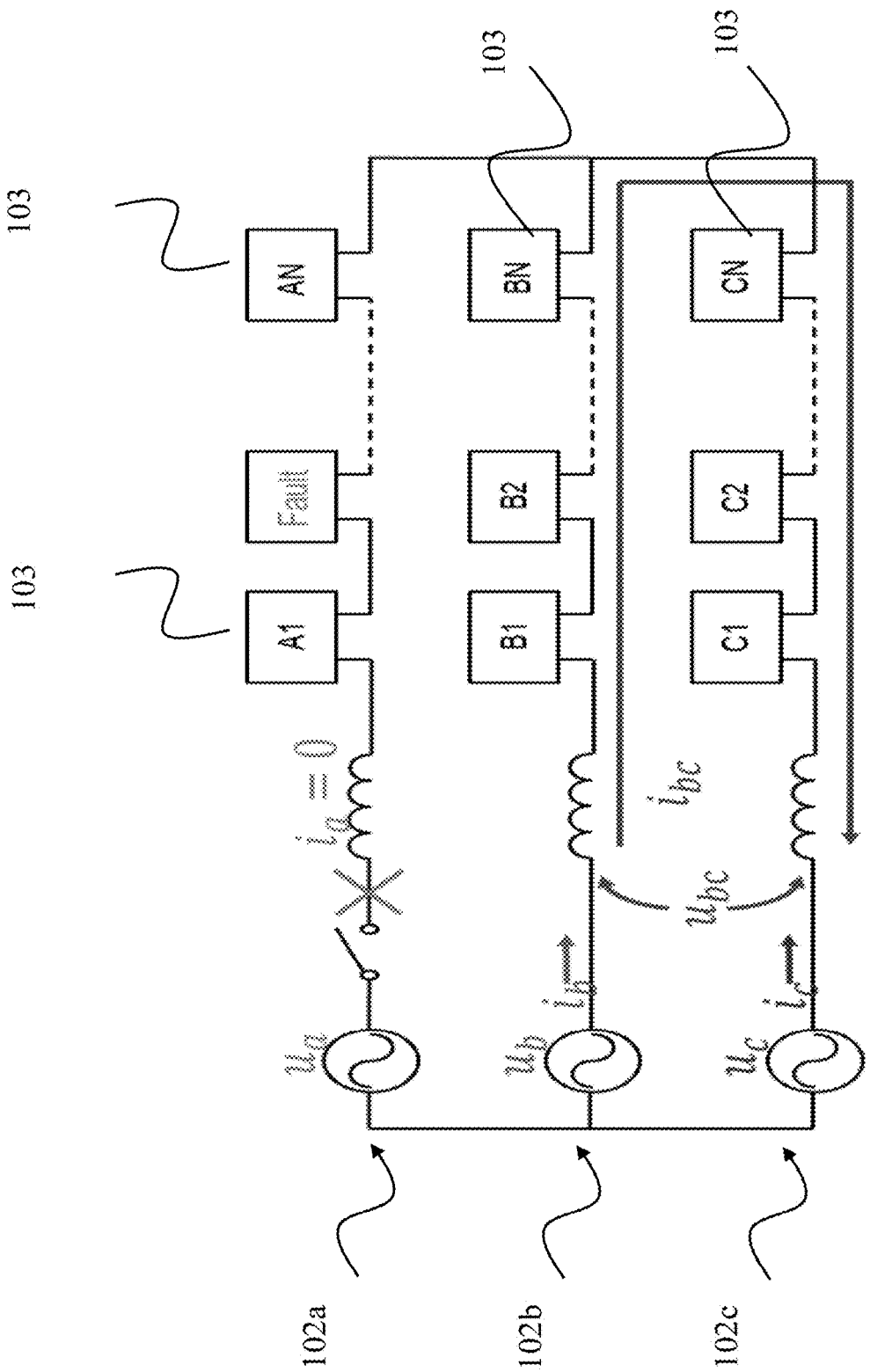
FIG. 6 shows a second control mode of a method for operating a SST according to an embodiment of this disclosure.

FIG. 6 shows the second control mode 2 of the method 200 for operating the SST 101 according to an embodiment of this disclosure. In this second control mode 2, the three phase SST 101 is operated in an abnormal operation. The used system parameters include at least one of a grid voltage $u_{bc} = u_b - u_c$ (for both phase branches 102b and 102c) and a grid current $i_{bc} = i_b = -i_c$ (for both phase branches 102b and 102c). The total cell number of the single phase branch, consisting of the two phase branches 102b and 102c, is 2N. A DC voltage of each cell 103 in this single phase branch is $V_{B1} \ldots V_{BN}$, $V_{C1} \ldots V_{CN}$.

Figure 7:
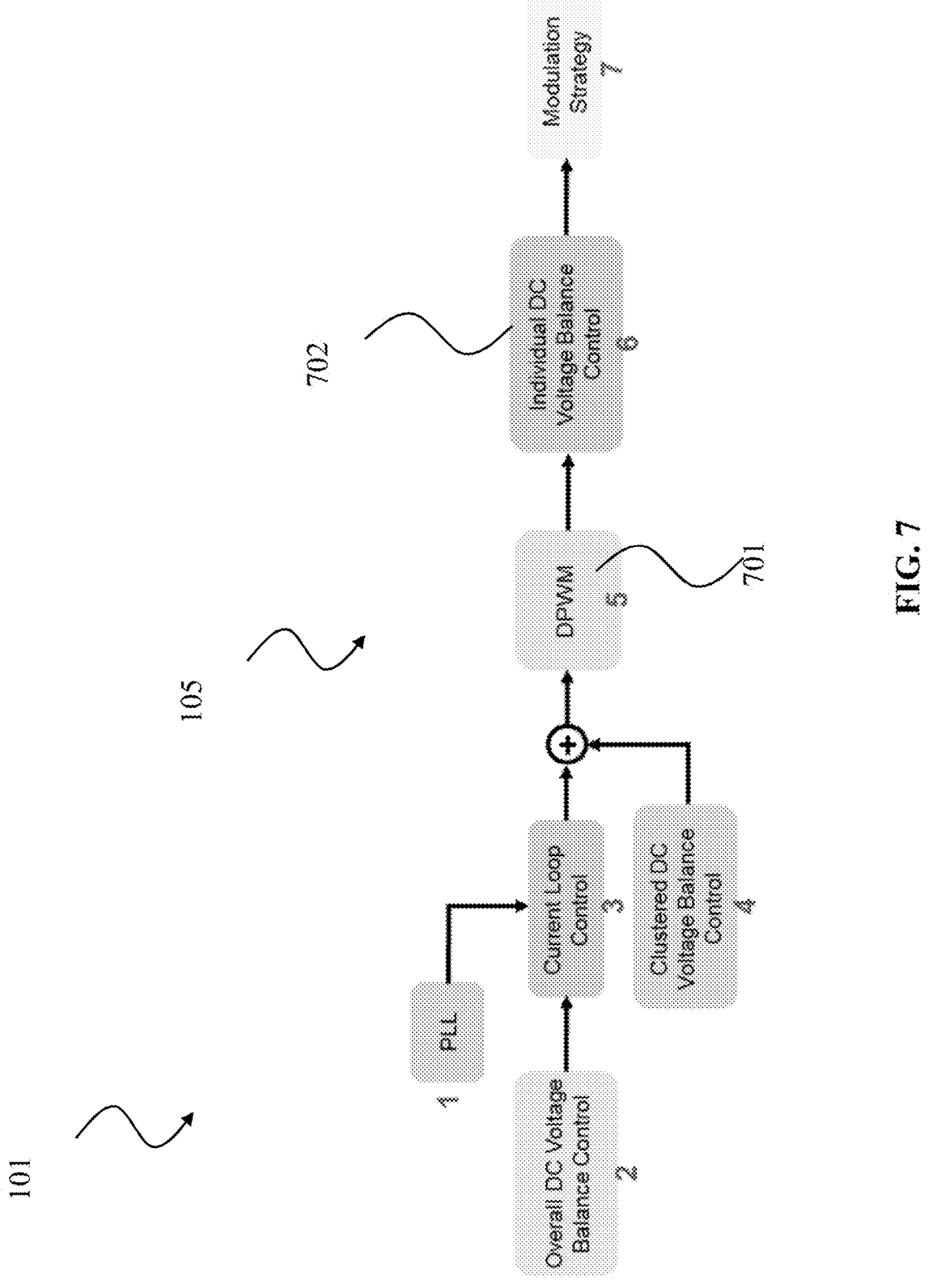
FIG. 7 shows a block diagram of a SST device and its controller according to an embodiment of this disclosure.

FIG. 7 shows a block diagram of a SST device 100 and its controller 105 according to an embodiment of this disclosure. The block diagram may include seven control parts (numbered 1-7 in FIG. 7). For the first control mode 1, all the shown control parts may be used. For the second control mode 2, the control part 4 may be removed or not used.

This disclosure also proposes, in an implementation for the second control mode 2, a DC voltage sort and new reference voltage reassignment method, which may be combined with a single phase DPWM method. For example, in the second control mode 2, the controller 105 may be configured to adapt reference voltages of the cells 103 of the two phase branches 102b and 102c based on a DPWM voltage For example, as shown in FIG. 7, the controller 105 of the SST device 101 may include at least a DPWM unit 701 (control part number 5) and a DC voltage control unit (control part number 6). The DPWM unit 701 may be configured to provide the DPWM voltage. The DPWM voltage may be subtracted from the reference voltage of one cell 103 of the two phase branches 102b and 102c, in order to operate that cell 103 in a clamped mode. The DPWM voltage may be added to the reference voltages of the other cells 103 of the two phase branches 102b and 102c, in order to operate these other cells 103 in a not-clamped mode. The DC voltage control unit 702 may be configured to sort DC voltages of all the cells 103 in the two-phase branches 102b and 102c, one or more times, to determine the cell 103 having the lowest DC voltage. Then, it may operate the cell 103 determined to have the lowest DC voltage in the clamped mode.

Figure 8:
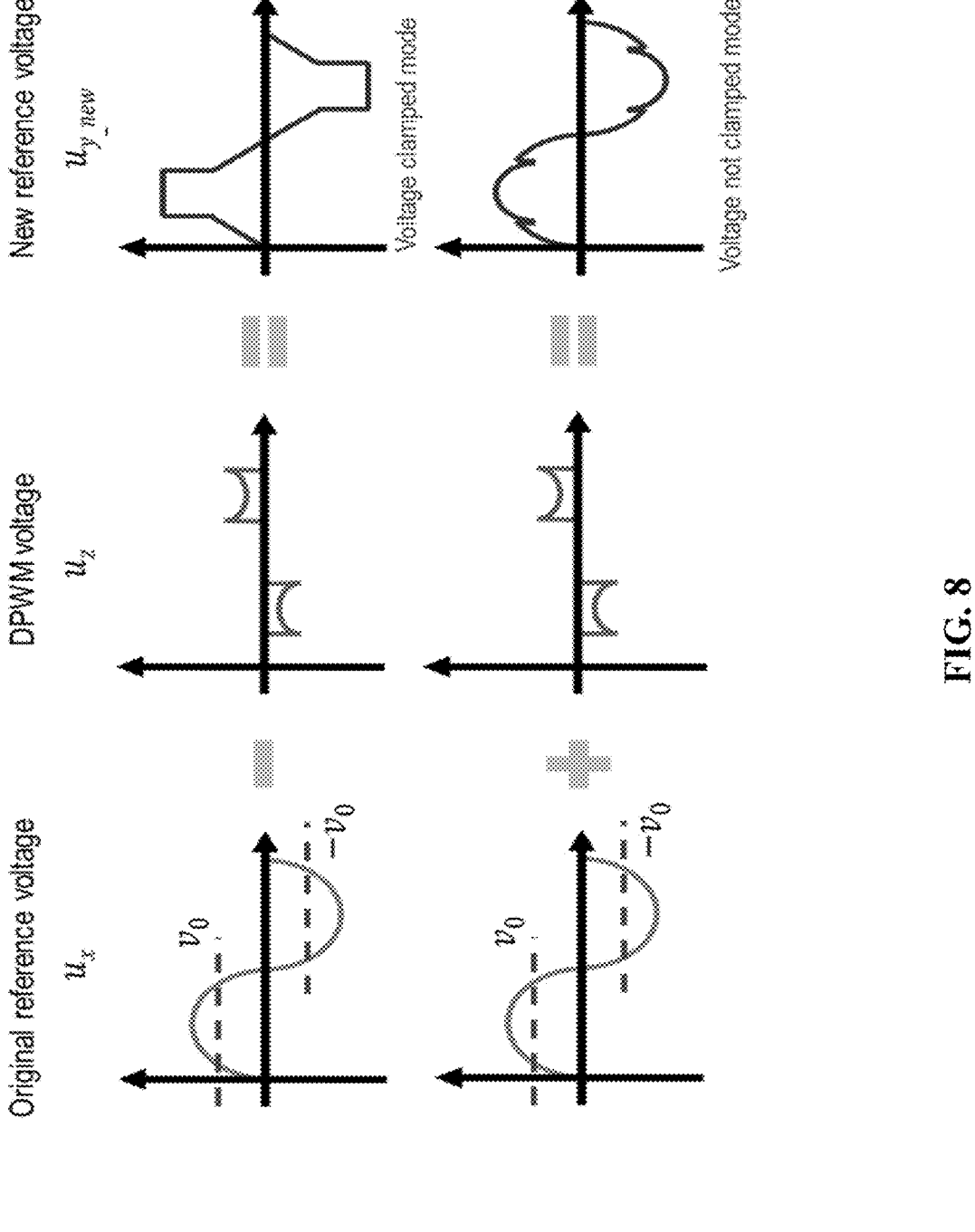
FIG. 8 FIGS. 8(*a*) and 8(*b*) show a basic principle of single-phase DPWM.

Thus, for the single phase DPWM, the basic principle is to add and subtract the DPWM voltage from the original reference voltage, so that the new reference voltage can work in two voltage modes, as it is show in FIG. 8. The first voltage mode is the voltage clamped mode shown in FIG. 8(a) and the second voltage mode is the voltage not-clamped mode shown in FIG. 8(b).

In case of the faulty condition of the SST 101, one cell 103 may work at the voltage clamped mode, and the other cells 103 may work at the voltage not-clamped mode, in order to keep the value of total reference voltage unchanged. The DPWM voltage and the new reference voltage can be calculated by the following equations:

$$u_z = \begin{cases} u_x - 1, & u_x > v_0 \\ u_x + 1, & u_x < -v_0 \\ 0, & -v_0 \leq u_x \leq v_0 \end{cases} \quad (1)$$

$$0 < v_0 < 1 \quad (2)$$

$$u_{1\_new} = u_x - u_z \quad (3)$$

$$u_{y\_new} = u_x + \frac{u_z}{2N-1}(y = 2 \ldots 2N) \quad (4)$$

where $u_x$ is the original reference voltage; $u_z$ is the DPWM voltage; $v_0$ is the threshold value, which affects the clamped range of voltage; $u_{1\_new}$ is the new reference voltage in the voltage clamped mode; $u_{y\_new}$ is the new reference voltage in the voltage not-clamped mode; N is the cell number in respectively each phase branch 102a, 102b and 102c of three phase SST 101. Notably, all voltage parameters may be per unit value.

Figure 9:
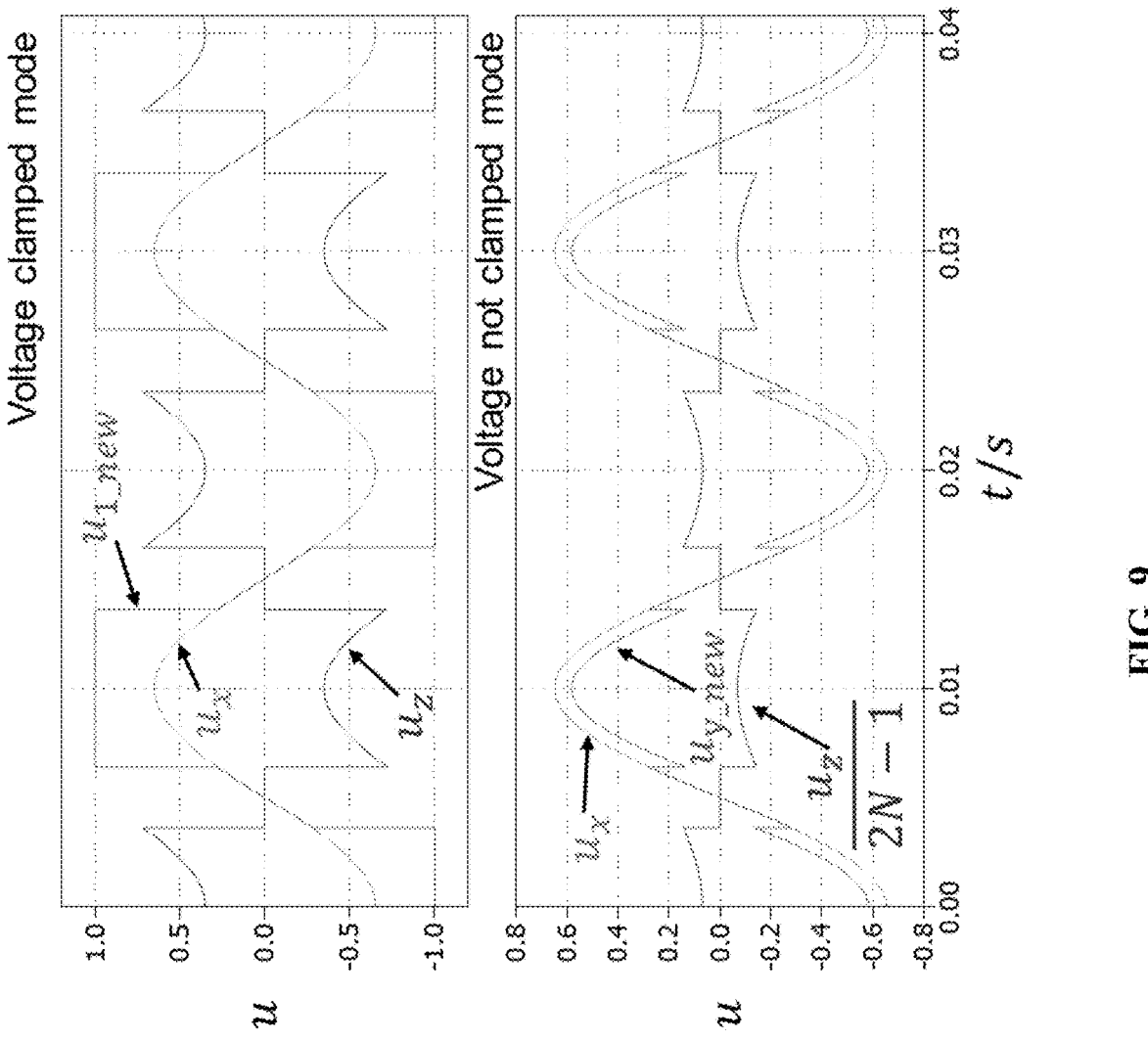
FIG. 9 FIGS. 9(*a*) and 9(*b*), show two voltage modes of single-phase DPWM.

FIG. 9 shows in 9(a) and 9(b) the two voltage modes of single phase DPWM. The power electronics devices 401 may be kept off in the voltage clamped mode time periods. Thereby, the switching loss of the SST 101 can be reduced.

For the individual DC voltage balance control, by analyzing the characteristics of the SST topology, when the cell 103 works in the voltage clamped mode, the capacitor 402 is in the charging state and the DC voltage is increased. When the cell 103 works in the voltage not-clamped mode, the capacitor 402 is in the discharging state and the DC voltage is decreased. According to the above, the DC voltage values of all the cells 103 may be first sorted by a certain frequency. Then, the new reference voltage in the voltage clamped mode (equation 3) may be assigned to the cell 103 with the lowest DC voltage, and the other new reference voltages in the voltage not-clamped mode (equation 4) may be assigned to the other cells 103. The individual DC voltage balance control can thus be achieved.

In the following, the performance of the solutions proposed by this disclosure is evaluated. In particular, the solutions provided by this disclosure were verified by simulation. The basic simulation parameters for a three phase SST 101 were selected as follows: the grid voltage was 4.286 kV; the SST total power was 75 kW; the input inductor was 4 mH; the capacitor 402 was 680 μF; the DC capacitor reference voltage was 1550V; the load 301 was 28862; the cell number in each phase branch was N=3.

At 0.4 s, one cell 103 in the A phase branch (the particular phase branch 102*a*) had the open circuit fault or the short circuit fault. The circuit breaker switch 104 was opened to cut off the connection between the A phase branch 102*a* and the power grid 110. The first control mode 1 was switched to the second control mode 2. The faulty three phase SST 101 was then controlled like a single phase SST (with the remaining two phase branches 102*b* and 102*c* being controlled as a single phase branch). At 0.7 s, the load of the B2 cell 103 was changed to 90%, and the load of the B3 cell 103 was changed to 110%.

Figure 10:
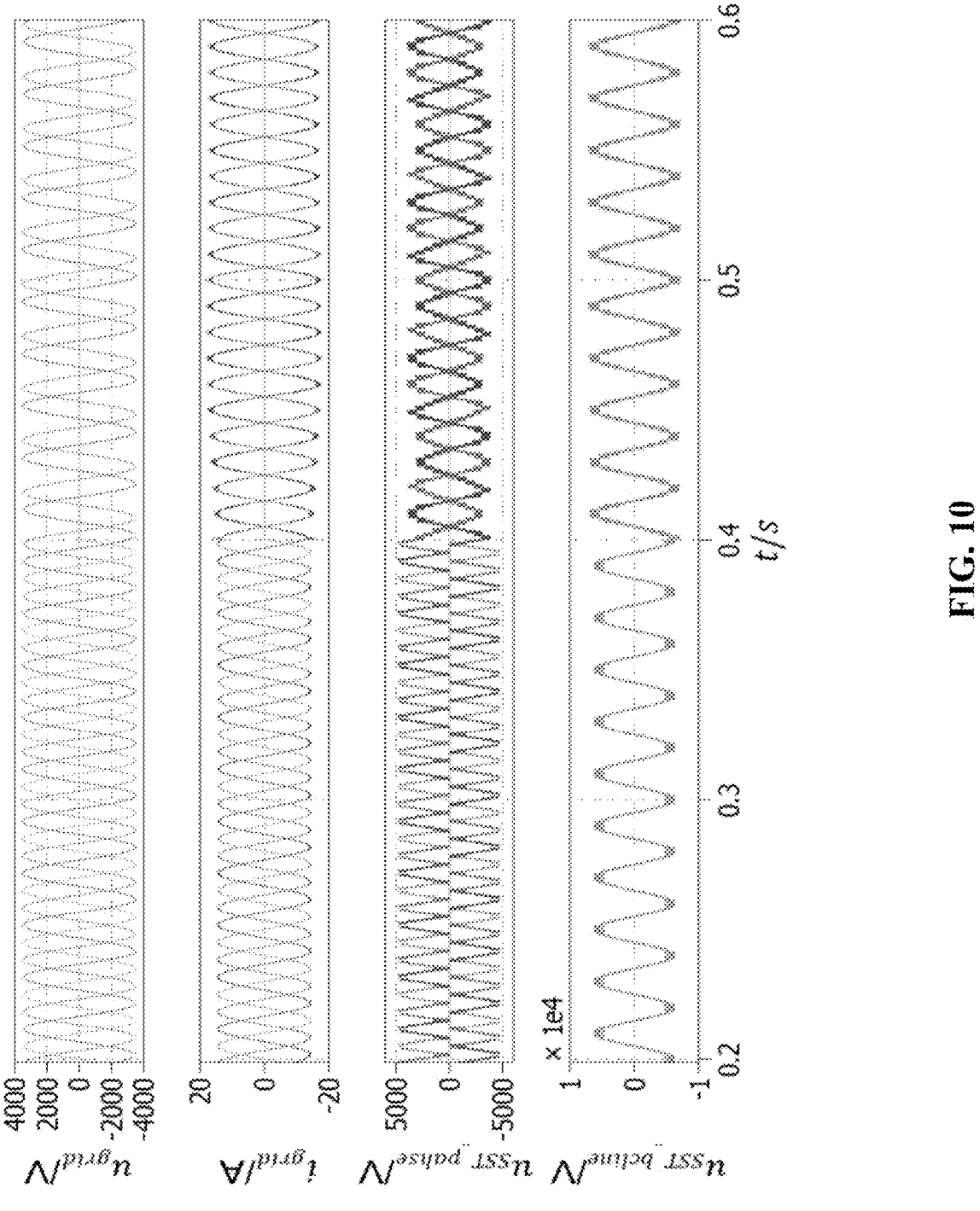
FIG. 10 shows AC side simulation waveforms of a SST operated by a method according to an embodiment of this disclosure.

FIG. 10 shows AC side simulation waveforms of the SST 101. The four waveforms from the top to the bottom are the grid phase voltage, the grid phase current, the SST phase voltage, and the SST line to line voltage between the B phase branch (the phase branch 102*b*) and the C phase branch (the phase branch 102*c*). After 0.4 s, the B phase branch 102*b* and the C phase branch 102*b* were able to continue normal operation.

Figure 11:
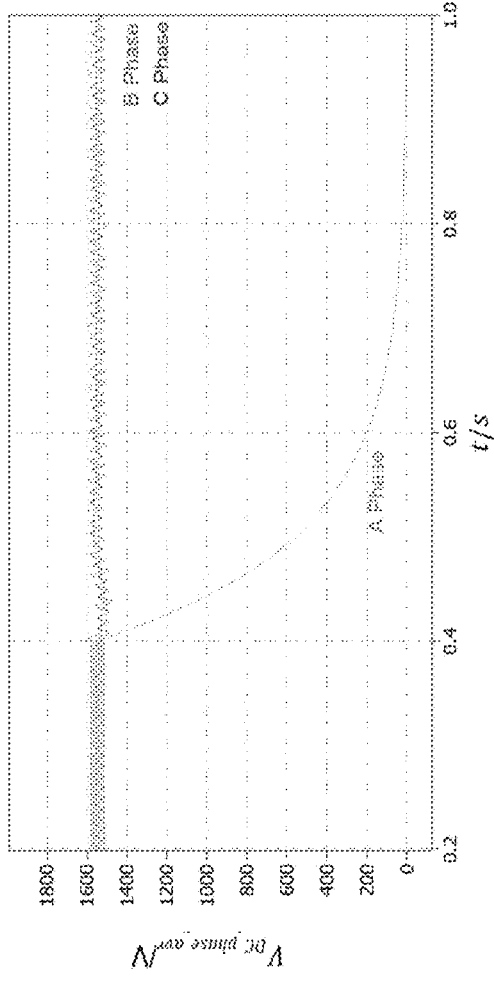
FIG. 11*a* shows an average DC voltage of each phase branch of a SST operated by a method according to an embodiment of this disclosure.
FIG. 11*b* shows a DC voltage of all cells in a B phase branch and a C phase branch of an exemplary SST operated by a method according to an embodiment of this disclosure.
Figure 11:
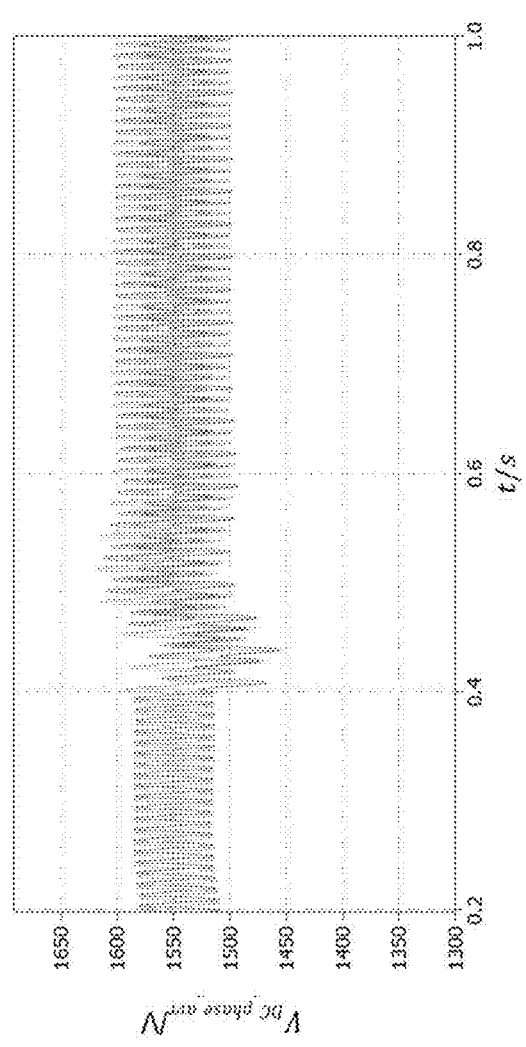
Figure 11:
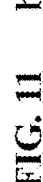

FIG. 11 shows DC side simulation waveforms of the SST 101, wherein FIG. 11(*a*) shows the average DC voltage of each phase branch 102*a*, 102*b* and 102*c*, and wherein FIG. 11(*b*) shows the DC voltage of all cells 103 in the B phase branch 102*b* and the C phase branch 102*c*. After 0.4 s, the average DC voltage of the A phase branch 102*a* was reduced to 0, and the average DC voltage of the B phase branch 102*b* and the C phase branch 102*c* were still stable. The DC voltage of all cells 103 in the B phase branch 102*b* and the C phase branch could still be kept in balance.

Figure 12:
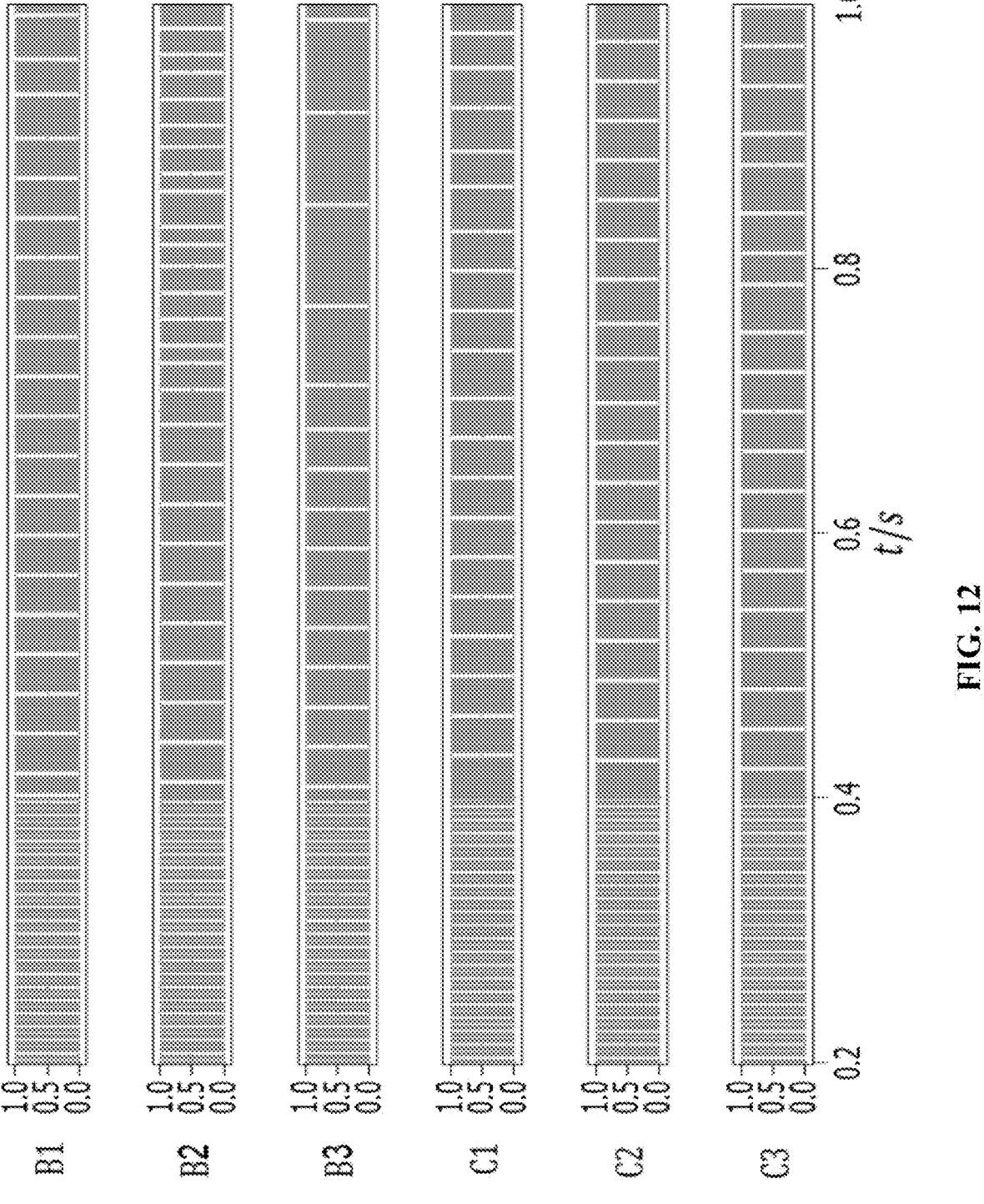
FIG. 12 shows cell switching signals of the B phase branch and the C phase branch.

FIG. 12 shows cell switching signals of the B phase branch 102*b* and the C phase branch 102*c*. After 0.4 s, all cells 103 were operated in the voltage clamped mode alternately at a certain frequency. Then, after 0.7 s, the loads of the B2 cell 103 and B3 cell 103 were changed and were different from the other cells' load. The DC voltage of the B2 cell 103 was lower and the DC voltage of the B3 cell 103 was higher. In order to keep the DC voltage of all cells 103 balanced, the frequency of the B2 cell 103 operating in the voltage clamped mode became higher, and the frequency of the B3 cell 103 operating in the voltage clamped mode became lower. The other cells 103 still had almost same frequency.

Notably, in this disclosure, and in all embodiments the following may also be valid:

(1) The load 301 associated with each cell 103 may a pure resistive load. However, the load 310 may also one or more DC/DC converters, such as a Dual Active Bridge (DAB) converter, LLC converter, Series Resonant Converter (SRC), or others.

(2) The above equation (3) and equation (4) may also be rewritten according to the following equations (5) and (6), respectively:

$$u_{w\_new} = u_x - u_z (w = 1 \ \dots \ n) \tag{5}$$

$$u_{y\_new} = u_x + \frac{n * u_z}{2N - n} (y = n + 1 \ \dots \ 2N, n < 2N) \tag{6}$$

where $u_{w\_new}$ is the new reference voltage in the voltage clamped mode; $u_{y\_new}$ is the new reference voltage in the voltage not-clamped mode; N is the cell number in each phase branch 102*a*, 102*b* and 102*c* of the three phase SST 101; and n is the number of cells 103 operating in voltage clamped mode.

The present disclosure has been described in conjunction with various embodiments as examples as well as implementations. However, other variations can be understood and effected by those persons skilled in the art and practicing the claimed matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A method of operating a solid state transformer (SST) having three parallel phase branches, wherein each of the three parallel phase branches comprises multiple cells and is connected via at least one switch to a power grid, and wherein the method comprises:
    operating the SST in a first control mode to open the at least one switch connecting a first of the three parallel phase branches to the power grid based on an open-circuit fault or a short-circuit fault occurring in at least one cell of the first of the three parallel phase branches, wherein each of the three parallel phase branches is individually controlled; and
    operating the SST in a second control mode to adapt reference voltages of the cells of each of second and third of the three parallel phase branches based on a discontinuous pulse width modulation (DPWM) voltage,
        wherein the second and third parallel phase branches are jointly controlled as a single phase branch.

2. The method according to claim 1, wherein each of the three parallel phase branches, operating in the first control mode, is controlled based on at least one of the following:
    an individual grid voltage for each of the three phase branches; and
    an individual grid current for each of the three phase branches.

3. The method according to claim 2, wherein in the second control mode, the cells of the second and third parallel phase branches are operated in a serial connection.

4. The method according to claim 1, wherein the second and third parallel phase branches, operating in the second control mode, are controlled based on at least one of the following:
    a single grid voltage for the second and third parallel phase branches; and
    a single grid current for the second and third parallel phase branches.

5. The method according to claim 4, wherein in the second control mode, the cells of the second and third parallel phase branches are operated in a serial connection.

6. The method according to claim 1, wherein the second and third parallel phase branches, operating in the second control mode, are controlled based on at least one of the following:
    a single grid voltage for the second and third parallel phase branches; and
    a single grid current for the second and third parallel phase branches.

7. The method according to claim 1, wherein in the second control mode, the cells of the second and third parallel phase branches are operated in a serial connection.

8. The method according to claim 1, the method further comprising adding or subtracting, in the second control mode, the DPWM voltage to or from a reference voltage of each of the cells comprising the second and third parallel phase branches, wherein the DPWM voltage is subtracted from the reference voltage of one cell of the second and third parallel phase branches to operate the one cell in a clamped mode, and wherein the DPWM voltage is added to each of the reference voltages of the other cells of the second and third of the three parallel phase branches to operate the other cells in a not-clamped mode.

9. The method according to claim 8, wherein the cells of the second and third of the three parallel phase branches are alternatingly operated in the clamped mode and the not-clamped mode.

10. The method according to claim 8, wherein a DC voltage of a cell operating in the clamped mode is increased.

11. The method according to claim 10, the method further comprising:

sorting DC voltages of all the cells in the second and third parallel branches one or more times, in order to determine the cell having a lowest DC voltage; and operating the cell determined to have the lowest DC voltage in the clamped mode.

12. A solid state transformer (SST) device comprising:

an SST having three parallel phase branches, wherein each of the three parallel phase branches comprises multiple cells, and wherein each of the three parallel phase branches is connectable, via at least one switch, to a power grid; and a controller configured to:

operate the SST in a first control mode to open the at least one switch connecting a first of the three parallel phase branches to the power grid based on an open-circuit fault or a short-circuit fault occurring in at least one cell of the first of the three parallel phase branches, wherein each of the three parallel phase branches is individually controlled in the first control mode; and operate the SST in a second control mode to adapt reference voltages of the cells of second and third of the three parallel phase branches based on a discontinuous pulse width modulation (DPWM) voltage, wherein the second and third parallel phase branches are jointly controlled as a single phase branch.

13. The SST device according to claim 12, wherein the controller comprises a DPWM unit and a DC voltage control unit, wherein in the second control mode, the DPWM unit is configured to provide the DPWM voltage, wherein the DPWM voltage is subtracted from the reference voltage of one cell of the second and third parallel phase branches to operate that cell in a clamped mode, and the DPWM voltage is added to the reference voltages of the other cells of the second and third parallel phase branches to operate these other cells in a not-clamped mode; and the DC voltage control unit is configured to sort DC voltages of all the cells in the second and third parallel phase branches one or more times, determine the cell having a lowest DC voltage, and operate the cell determined to have the lowest DC voltage in the clamped mode.

14. The SST device according to claim 12, wherein the controller is further configured to:

control, in the first control mode, each of the three parallel phase branches based on an individual grid voltage for each of the three parallel phase branches and/or an individual grid current for each of the three parallel phase branches; and/or control, in the second control mode, the second and third parallel phase branches based on a single grid voltage for the second and third parallel phase branches and/or a single grid current for the second and third parallel phase branches.

15. The SST device according to claim 12, wherein each of the three parallel phase branches of the SST comprises:

a cell array comprising the multiple cells of each of the three parallel phase branches connected in series; and the at least one switch connected in series between the cell array and a connection port for connecting each of the three parallel phase branches of the SST to the power grid.

16. The SST device according to claim 15, wherein the at least one switch is connected to the cell array via an inductor and/or a resistor.

17. The SST device according to claim 15, wherein each cell comprises a switchable power electronics device connected to a capacitor; and wherein the capacitor is connected to a load in order to supply power to the load.

18. A non-transitory computer readable program comprising instructions that, upon being executed by a computer or a controller, causes the computer or the controller to perform a method of operating a solid state transformer (SST), wherein the SST comprises three parallel phase branches, wherein each of the three parallel phase branches comprises multiple cells and is connected via at least one switch to a power grid, and wherein the method comprises:

operating the SST in a first control mode to open the at least one switch connecting a first of the three parallel phase branches to the power grid based on an open-circuit fault or a short-circuit fault occurring in at least one cell of the first of the three parallel phase branches, wherein each of the three parallel phase branches is individually controlled; and operating the SST in a second control mode to adapt reference voltages of the cells of each of second and third of the three parallel phase branches based on a discontinuous pulse width modulation (DPWM) voltage, wherein the second and third parallel phase branches are jointly controlled as a single phase branch.

19. The non-transitory computer readable program according to claim 18, wherein each of the three parallel phase branches, operating in the first control mode, is controlled based on at least one of the following:

an individual grid voltage for each of the three phase branches; and an individual grid current for each of the three phase branches.

20. The non-transitory computer readable program according to claim 18, wherein the second and third parallel phase branches, operating in the second control mode, are controlled based on at least one of the following:

a single grid voltage for the second and third parallel phase branches; and a single grid current for the second and third parallel phase branches.

* * * * *